(12) United States Patent
Gupta et al.

(10) Patent No.: US 9,324,034 B2
(45) Date of Patent: Apr. 26, 2016

(54) ON-DEVICE REAL-TIME BEHAVIOR ANALYZER

(71) Applicant: QUALCOMM Incorporated, San Diego, CA (US)

(72) Inventors: Rajarshi Gupta, Sunnyvale, CA (US); Xuetao Wei, Riverside, CA (US); Anil Gathala, Santa Clara, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 13/773,247

(22) Filed: Feb. 21, 2013

(65) Prior Publication Data

US 2013/0304676 A1 Nov. 14, 2013

Related U.S. Application Data

(60) Provisional application No. 61/748,217, filed on Jan. 2, 2013, provisional application No. 61/646,590, filed on May 14, 2012, provisional application No. 61/683,274, filed on Aug. 15, 2012.

(51) Int. Cl.
*G06N 99/00* (2010.01)
*G06N 5/04* (2006.01)

(52) U.S. Cl.
CPC .............. *G06N 99/005* (2013.01); *G06N 5/043* (2013.01)

(58) Field of Classification Search
CPC ........... G06F 7/06; G06F 7/08; F06N 99/005; F06N 5/043
See application file for complete search history.

(56) References Cited

U.S. PATENT DOCUMENTS

| 5,870,735 A | 2/1999 | Agrawal et al. |
| 6,532,541 B1 | 3/2003 | Chang et al. |

(Continued)

FOREIGN PATENT DOCUMENTS

| CN | 102591696 A | 7/2012 |
| EP | 1182552 A2 | 2/2002 |

(Continued)

OTHER PUBLICATIONS

Kolter, "Learning to Detect Malicious Executables in the Wild", ACM Knowl. Discovery and Data Mining (KDD), Aug. 22-25, 2004, pp. 470-478.*

(Continued)

*Primary Examiner* — Kakali Chaki
*Assistant Examiner* — Vincent Gonzales
(74) *Attorney, Agent, or Firm* — Nicholas A. Cole

(57) ABSTRACT

Methods, systems and devices for generating data models in a communication system may include applying machine learning techniques to generate a first family of classifier models using a boosted decision tree to describe a corpus of behavior vectors. Such behavior vectors may be used to compute a weight value for one or more nodes of the boosted decision tree. Classifier models factors having a high probably of determining whether a mobile device behavior is benign or not benign based on the computed weight values may be identified. Computing weight values for boosted decision tree nodes may include computing an exclusive answer ratio for generated boosted decision tree nodes. The identified factors may be applied to the corpus of behavior vectors to generate a second family of classifier models identifying fewer factors and data points relevant for enabling the mobile device to determine whether a behavior is benign or not benign.

30 Claims, 13 Drawing Sheets

(56) References Cited

U.S. PATENT DOCUMENTS

| | | |
|---|---|---|
| 6,643,802 B1 | 11/2003 | Frost et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0300765 A1 | 12/2009 | Moskovitch et al. |
| 2009/0327168 A1 | 12/2009 | Weinberger et al. |
| 2010/0011029 A1 | 1/2010 | Niemela |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1* | 12/2012 | Hedau et al. .................. 382/159 |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |

(56) References Cited

U.S. PATENT DOCUMENTS

| | | | |
|---|---|---|---|
| 2013/0305359 | A1 | 11/2013 | Gathala et al. |
| 2014/0007183 | A1 | 1/2014 | Qureshi et al. |
| 2014/0051432 | A1 | 2/2014 | Gupta et al. |
| 2014/0053260 | A1 | 2/2014 | Gupta et al. |
| 2014/0053261 | A1 | 2/2014 | Gupta et al. |
| 2014/0096246 | A1 | 4/2014 | Morrissey et al. |
| 2014/0150100 | A1 | 5/2014 | Gupta et al. |
| 2014/0187177 | A1 | 7/2014 | Sridhara et al. |
| 2014/0188781 | A1 | 7/2014 | Fawaz |
| 2014/0205099 | A1 | 7/2014 | Christodorescu et al. |
| 2014/0237595 | A1 | 8/2014 | Sridhara et al. |
| 2014/0245306 | A1 | 8/2014 | Gathala |
| 2014/0279745 | A1 | 9/2014 | Esponda et al. |
| 2014/0317734 | A1 | 10/2014 | Valencia et al. |
| 2014/0337862 | A1 | 11/2014 | Valencia et al. |
| 2015/0148109 | A1 | 5/2015 | Gupta et al. |
| 2015/0356462 | A1 | 12/2015 | Fawaz et al. |

FOREIGN PATENT DOCUMENTS

| | | | |
|---|---|---|---|
| EP | 1983686 | A1 | 10/2008 |
| EP | 2182458 | A1 | 5/2010 |
| EP | 2326057 | A1 | 5/2011 |
| EP | 2406717 | A1 | 1/2012 |
| EP | 2680182 | A1 | 1/2014 |
| TW | 200937198 | A | 9/2009 |
| TW | 201239618 | A | 10/2012 |
| WO | WO-2010048502 | | 4/2010 |
| WO | 2010126416 | A1 | 11/2010 |
| WO | 2011147580 | A1 | 12/2011 |
| WO | 2013016692 | | 1/2013 |
| WO | WO-2013080096 | A1 | 6/2013 |
| WO | WO-2013172865 | A1 | 11/2013 |
| WO | WO-2013173003 | A2 | 11/2013 |
| WO | WO-2013173044 | A2 | 11/2013 |

OTHER PUBLICATIONS

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.
International Search Report and Written Opinion—PCT/US2013/035943—ISA/EPO—Nov. 7, 2013.
Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.
Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.
Shabtai A., "Malware Detection on Mobile Devices," Eleventh International Conference on Mobile Data Management, IEEE Computer Society, 2010, pp. 289-290.
Sheen S., et al., "Network Intrusion Detection using Feature Selection and Decision tree classifier," TENCON—IEEE Region 10 Conference, 2008, pp. 1-4.
Asaf Shabtai et al, "Detaching Unknown malicious Code by Applying Classification Techniques on OpCode Patterns," Security Informatics, 2012, 1:1.
Caruana, et al., "An Empirical Comparison of Supervised Learning Algorithms", ICML, 2006, 8 pgs.
Caruana, et al., "An Empirical Evaluation of Supervised Learning in High Dimensions", ICML, 2008, 8 pgs.
Co-pending U.S. Appl. No. 13/558,527, filed Jul. 26, 2012.
Qin F., "System Support for Improving Software Dependability During Production Runs," Urbana, Illinois, 1998, pp. 1-116.
Wang Y-M., et al., "STRIDER: A Black-Box, State-based Approach to Change and Configuration Management and Support," 2003 LISA XVII—Oct. 26-31, 2003—San Diego, CA, pp. 165-178.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.
Kirda E., et al., "Behavior-Based Spyware Detection", 15th USENIX Security Symposium, 2002, pp. 273-288.
De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
International Search Report and Written Opinion—PCT/US2013/078352—ISA/EPO—Nov. 10, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.
Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.
Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.
Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.
Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.
Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516-520, XP031200055, DOI: 10.1109/WI-IATW.2007.52 the whole document.
Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.
Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.
Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].
Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.
Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

(56) References Cited

OTHER PUBLICATIONS

Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013].

Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012].

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI: 10.1007/s11036-008-0113-x.

Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-455X, DOI: 10.1109/AINA.2013.88 ISBN: 978-1-4673-5550-6 [retrived on Jun. 13, 2013].

Kaspersky Endpoint Security 8 for Smartphone Program Version 8.0, Updated on Feb. 8, 2012.

Tan, P.N., et al., "Introduction to data mining," Library of Congress, 2006, Chapter 4.

Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.

Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.

\* cited by examiner

ON-DEVICE REAL-TIME BEHAVIOR ANALYZER

RELATED APPLICATIONS

This application claims the benefit of priority to U.S. Provisional Patent Application No. 61/748,217 entitled "On-Device Real-Time Behavior Analyzer" filed Jan. 2, 2013; U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of all of which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of generating data models in a communication system, which may include applying machine learning techniques to generate a first family of classifier models using a boosted decision tree to describe a corpus of behavior vectors, computing a weight value for one or more nodes of the boosted decision tree, and determining which factors in the first family of classifier models have a high probability of enabling a mobile device to conclusively determine whether a mobile device behavior is benign or not benign based on the computed weight values.

In an aspect, computing a weight value for one or more nodes of the boosted decision tree may include computing an exclusive answer ratio for one or more nodes of the boosted decision tree. In a further aspect, computing a weight value for one or more nodes of the boosted decision tree may include computing an answer ratio for one or more nodes of the boosted decision tree. In a further aspect, the method may include applying the factors to the corpus of behavior vectors to generate a second family of classifier models that identify fewer data points as being relevant for enabling the mobile device to conclusively determine whether the mobile device behavior is benign or not benign, and generating a mobile device classifier based on the second family of classifier models. In a further aspect, the method may include sending the mobile device classifier to a mobile computing device. In a further aspect, the method may include receiving the mobile device classifier in a device processor of the mobile computing device, and classifying in the device processor a behavior of the mobile computing device based on the received mobile device classifier.

Further aspects include a communication system including a server having means for applying machine learning techniques to generate a first family of classifier models using a boosted decision tree to describe a corpus of behavior vectors, means for computing a weight value for one or more nodes of the boosted decision tree, means for determining which factors in the first family of classifier models have a high probability of enabling a mobile device to conclusively determine whether a mobile device behavior is benign or not benign based on the computed weight values, means for applying the factors to the corpus of behavior vectors to generate a second family of classifier models that identify fewer data points as being relevant for enabling the mobile device to conclusively determine whether the mobile device behavior is benign or not benign, means for generating a mobile device classifier based on the second family of classifier models, and means for sending the generated mobile device classifier to the mobile device. The communication system may also include a mobile computing device having means for sending behavior vectors to the server, means for receiving the mobile device classifier from the server, and means for classifying a behavior of the mobile computing device based on the received mobile device classifier.

In an aspect, means for computing a weight value for one or more nodes of the boosted decision tree may include means for computing an exclusive answer ratio for one or more nodes of the boosted decision tree. In a further aspect, means for computing a weight value for one or more nodes of the boosted decision tree may include means for computing an answer ratio for one or more nodes of the boosted decision tree.

Further aspects include a communication system, including a server including a server processor configured with server-executable instructions to perform operations including applying machine learning techniques to generate a first family of classifier models using a boosted decision tree to describe a corpus of behavior vectors, computing a weight value for one or more nodes of the boosted decision tree, determining which factors in the first family of classifier models have a high probability of enabling a mobile device to conclusively determine whether a mobile device behavior is benign or not benign based on the computed weight values, applying the factors to the corpus of behavior vectors to generate a second family of classifier models that identify fewer data points as being relevant for enabling the mobile device to conclusively determine whether the mobile device behavior is benign or not benign, generating a mobile device classifier based on the second family of classifier models, and sending the generated mobile device classifier to the mobile device, and a mobile computing device including a device processor configured with processor-executable instructions to perform operations including, including sending behavior vectors to the server, receiving the mobile device classifier from the server, and classifying a behavior of the mobile computing device based on the received mobile device classifier.

In an aspect, the server processor may be configured with server-executable instructions such that computing a weight value for one or more nodes of the boosted decision tree may include computing an exclusive answer ratio for one or more nodes of the boosted decision tree. In a further aspect, the server processor may be configured with server-executable instructions such that computing a weight value for one or more nodes of the boosted decision tree may include computing an answer ratio for one or more nodes of the boosted decision tree.

Further aspects include a server computing device that may include means for applying machine learning techniques to generate a first family of classifier models using a boosted decision tree to describe a corpus of behavior vectors, means for computing a weight value for one or more nodes of the boosted decision tree, and means for determining which factors in the first family of classifier models have a high probability of enabling a mobile device to conclusively determine whether a mobile device behavior is benign or not benign based on the computed weight values.

In an aspect, means for computing a weight value for one or more nodes of the boosted decision tree may include means for computing an exclusive answer ratio for one or more nodes of the boosted decision tree. In a further aspect, means for computing a weight value for one or more nodes of the boosted decision tree may include means for computing an answer ratio for one or more nodes of the boosted decision tree. In a further aspect, the server computing device may include means for applying the factors to the corpus of behavior vectors to generate a second family of classifier models that identify fewer data points as being relevant for enabling the mobile device to conclusively determine whether the mobile device behavior is benign or not benign, and means for generating a mobile device classifier based on the second family of classifier models. In a further aspect, the server computing device may include means for sending the generated mobile device classifier to a mobile computing device.

Further aspects include a computing device that may include a processor configured with processor-executable instructions to perform operations including applying machine learning techniques to generate a first family of classifier models using a boosted decision tree to describe a corpus of behavior vectors, computing a weight value for one or more nodes of the boosted decision tree, and determining which factors in the first family of classifier models have a high probability of enabling a mobile device to conclusively determine whether a mobile device behavior is benign or not benign based on the computed weight values.

In an aspect, the processor may be configured with processor-executable instructions such that computing a weight value for one or more nodes of the boosted decision tree may include computing an exclusive answer ratio for one or more nodes of the boosted decision tree. In a further aspect, the processor may be configured with processor-executable instructions such that computing a weight value for one or more nodes of the boosted decision tree may include computing an answer ratio for one or more nodes of the boosted decision tree. In a further aspect, the processor may be configured with processor-executable instructions to perform operations further including applying the factors to the corpus of behavior vectors to generate a second family of classifier models that identify fewer data points as being relevant for enabling the mobile device to conclusively determine whether the mobile device behavior is benign or not benign, and generating a mobile device classifier based on the second family of classifier models. In a further aspect, the processor may be configured with processor-executable instructions to perform operations further including sending the generated mobile device classifier to a mobile computing device.

Further aspects include a non-transitory computer readable storage medium having stored thereon server-executable software instructions configured to cause a server processor to perform operations for generating data models in a communication system, including applying machine learning techniques to generate a first family of classifier models using a boosted decision tree to describe a corpus of behavior vectors, computing a weight value for one or more nodes of the boosted decision tree, and determining which factors in the first family of classifier models have a high probability of enabling a mobile device to conclusively determine whether a mobile device behavior is benign or not benign based on the computed weight values.

In an aspect, the stored server-executable software instructions may be configured to cause the server processor to perform operations such that computing a weight value for one or more nodes of the boosted decision tree may include computing an exclusive answer ratio for one or more nodes of the boosted decision tree. In a further aspect, the stored server-executable software instructions may be configured to cause the server processor to perform operations such that computing a weight value for one or more nodes of the boosted decision tree may include computing an answer ratio for one or more nodes of the boosted decision tree. In a further aspect, the stored server-executable software instructions may be configured to cause the server processor to perform operations further including applying the factors to the corpus of behavior vectors to generate a second family of classifier models that identify fewer data points as being relevant for enabling the mobile device to conclusively determine whether the mobile device behavior is benign or not benign, and generating a mobile device classifier based on the second family of classifier models. In a further aspect, the stored server-executable software instructions may be configured to cause the server processor to perform operations further including sending the generated mobile device classifier to a mobile computing device.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
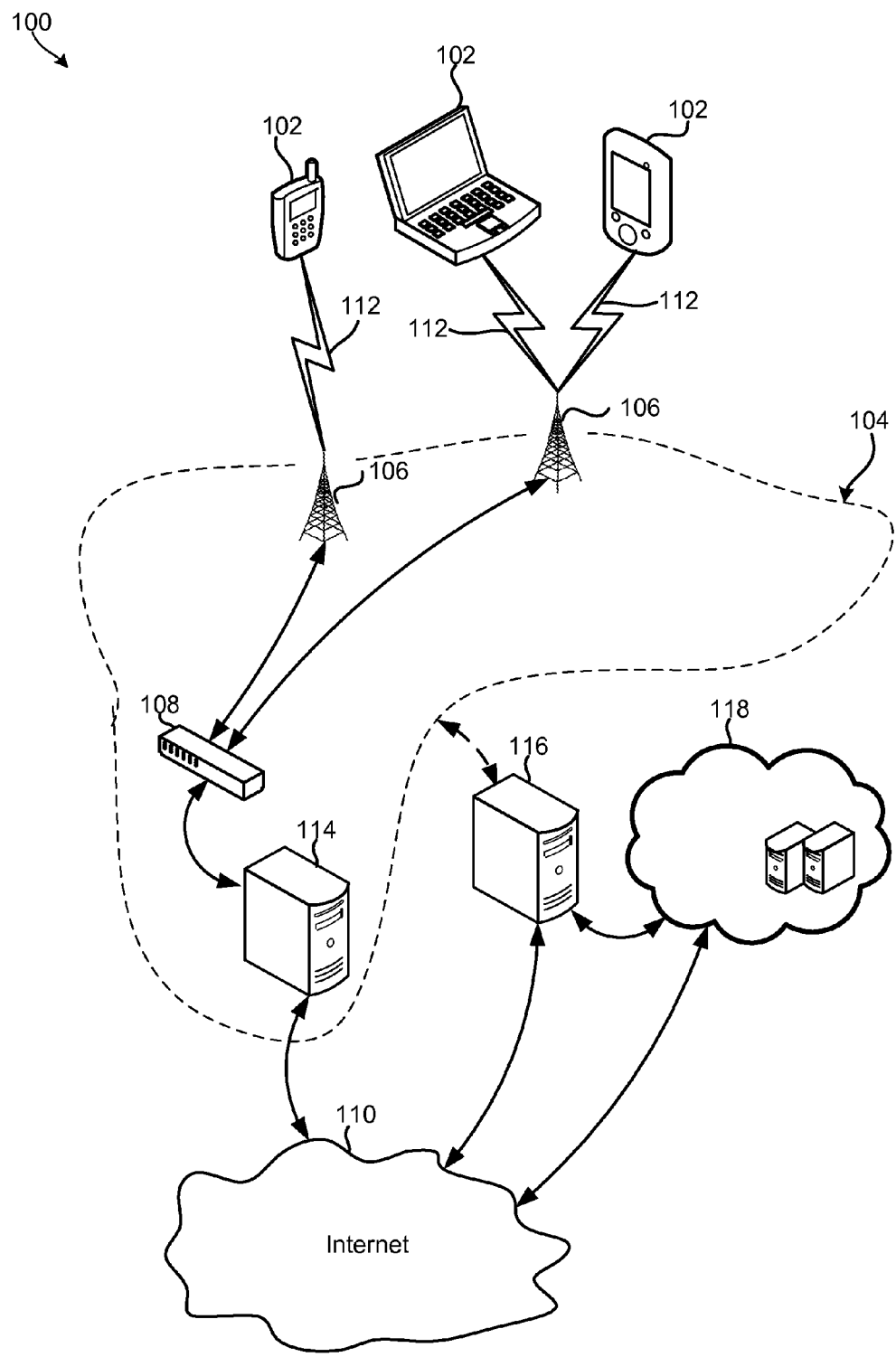
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "performance degradation" is used herein to refer to a wide variety of undesirable mobile device operations and characteristics, such as longer processing times, lower battery life, loss of private data, malicious economic activity (e.g., sending unauthorized premium SMS message), operations relating to commandeering the mobile device or utilizing the phone for spying or botnet activities, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Various solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of individual application programs or processes, and do not provide an accurate or complete model of the performance-degrading mobile device behaviors. For these and other reasons, existing modeling solutions are not suitable for use in mobile devices.

Various other solutions exist for detecting malicious software by using machine learning techniques. These solutions typically analyze a software application or process via an application in a cloud-based server. Such analysis may consist of a mathematical transformation to extract the features of the software application, and then executing the features on a previously generated machine learning model. The execution of the model allows improving the current model, by updating it with the new information gained from executing the current application.

However, many of these solutions are not suitable for use on mobile devices because they require evaluating a very large corpus of data, are limited to evaluating an individual application program or process, or require the execution of computationally-intensive processes in the mobile device. For example, an existing solution may apply a corpus of training data to derive a model that takes as input a feature vector derived from the application of a mathematical transformation to an individual software application. However, such a solution does not generate a first family of classifier models using a boosted decision tree to describe a corpus of behavior vectors, compute a weight value for one or more nodes of the boosted decision tree, and determine which factors in the first family of classifier models have the highest probability of enabling a mobile device to conclusively determine whether a mobile device behavior is malicious or benign based on the computed weight values. Also, such a solution does not compute an exclusive answer ratio or an answer ratio for one or more nodes of the boosted decision tree to optimize or reduce the number of factors/data points that require evaluation when identifying or responding to performance-degrading mobile device behaviors. For these and other reasons, existing machine learning techniques are not well suited for use in the complex yet resource-constrained systems of modern mobile devices.

There are a variety of factors that may contribute to the degradation in performance and power utilization levels of a mobile device over time, including poorly designed software applications, malware, viruses, fragmented memory, background processes, etc.

Mobile devices are resource constrained systems that have relatively limited processing, memory, and energy resources. Modern mobile devices are also complex systems, and there may be thousands of features/factors and billions of datapoints that require analysis to properly identify the cause or source of a mobile device's degradation. Due to these constraints, it is often not feasible to evaluate all the factors that may contribute to the degrade performance and/or power utilization levels of the complex yet resource-constrained systems of modern mobile devices.

The various aspects provide network servers, mobile devices, systems, and methods for efficiently identifying, classifying, modeling, preventing, and/or correcting the conditions and/or mobile device behaviors that often degrade a mobile device's performance and/or power utilization levels over time. By storing information on such conditions and corrective actions in a central database, such as a network server or the "cloud," and enabling mobile devices to access and use the information stored in this database, the various aspects enable mobile devices to react to performance-limiting and undesirable operating conditions much faster and with lower power consumption than if all such analyses accomplished independently within each mobile device.

To provide better performance in view of these facts, the various aspects include mobile devices and network servers configured to work in conjunction with a network service (e.g., anti-virus partner, security partner, etc.) to intelligently and efficiently identify factors that may contribute to the degradation in performance and power utilization levels of mobile devices over time. Various aspects may identify performance-degrading factors on the mobile device without consuming an excessive amount of processing, memory, or energy resources of the mobile device.

In an aspect, an observer process, daemon, module, or sub-system (herein collectively referred to as a "module") of the mobile device may instrument or coordinate various application programming interfaces (APIs) at various levels of the mobile device system, and collect behavior information from the instrumented APIs. In an aspect, the mobile device may also include an analyzer module, and the analyzer module may generate one or more classifier modules and/or a classifier module that includes one or more classifiers. The observer module may communicate (e.g., via a memory write operation, function call, etc.) the collected behavior information to the classifier module and/or the analyzer module (e.g., via a memory write operation, etc.) of the mobile device, which may analyze and/or classify the collected behavior information, generate behavior vectors, generate spatial and/or temporal correlations based on the behavior vector and information collected from various other mobile device subsystems, and determine whether a particular mobile device behavior, software application, or process is benign, suspicious, or malicious/performance-degrading.

In an aspect, the classifier module may be included in, or as part of, the analyzer module of the mobile device. In an aspect, one or more classifiers may be generated as a function of a training dataset, which may include thousands of features and billions of entries. In an aspect, one or more classifiers may be generated from a reduced training dataset that includes only the features/entries that are most relevant for determining whether a particular mobile device behavior, software application, or process is benign, suspicious, or malicious/performance-degrading.

In an aspect, the analyzer module and/or classifier module of the mobile device may be configured to perform real-time analysis operations, which may include applying data, algorithms, and/or behavior models to behavior information collected by the observer module to determine whether a mobile device behavior is benign, suspicious, or malicious/performance-degrading. In an aspect, the analyzer module and/or classifier module may determine that a mobile device behavior is suspicious when the analyzer/classifier module does not have sufficient information to classify or conclusively determine that the behavior is either benign or malicious/performance-degrading.

In an aspect, the analyzer module and/or classifier module of the mobile device may be configured to communicate the results of its real-time analysis operations to the observer module when it determines that a device behavior is suspicious. The observer module may adjust the granularity of its observations (i.e., the level of detail at which mobile device behaviors are observed) and/or change the behaviors that are observed based on information received from the classifier module (e.g., results of the real-time analysis operations), generate or collect new or additional behavior information, and send the new/additional information to the analyzer module and/or classifier module for further analysis/classification.

Such feedback communications between the observer and the analyzer/classifier modules (e.g., classifier module sending the results of its real-time analysis operations to the observer module, and the observer module sending updated behavior information to the classifier module) may enable a mobile device processor to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication may also enable the mobile device processor to adjust or modify the data/behavior models locally in the mobile device without consuming an excessive amount of the mobile device's processing, memory, or energy resources.

In various aspects, the mobile device may be configured to communicate with a network server that includes an offline classifier and/or a real-time online classifier. The offline classifier may generate robust data/behavior models based on information received from a cloud service/network. The real-time online classifier may generate lean data/behavior models based on analyzing larger and more complicated behavior models generated from information received from the cloud service/network. Both the online and offline classifiers may generate data/behavior models that include a reduced subset of information made available by the network server or service for a particular mobile device. In an aspect, generating the lean data/behavior models may include generating one or more reduced feature models (RFMs).

The network server may send the generated lean data/behavior models to the mobile device. The mobile device may receive and implement, apply, or use lean data/behavior models to identify suspicious or performance-degrading mobile device behaviors, software applications, processes, etc. Since the lean data/behavior models include a reduced subset of the relevant information made available by the network server or service, the mobile device may use the lean data/behavior models to determine whether a mobile device behavior is malicious/performance-degrading or benign without consuming an excessive amount of processing, memory, or energy resources of the mobile device. The mobile device may then correct or prevent the identified performance-degrading mobile device behaviors from degrading the performance and power utilization levels of the mobile device.

In various aspects, the network server may be configured to generate or update the lean data/behavior models by performing, executing, and/or applying machine learning and/or context modeling techniques to behavior information and/or the results of behavior analyses provided by many mobile devices. Thus, the network server may receive a large number of reports from many mobile devices and analyze, consolidate or otherwise turn such crowd-sourced information into useable information, particularly a lean data set or focused behavior models that can be used or accessed by all mobile devices. The network server may continuously reevaluate existing lean data/behavior models as new behavior/analysis reports are received from mobile devices, and/or generate new or updated lean data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the network server may be configured to generate the lean data/behavior models to include an initial feature set (e.g., an initial reduced feature model) and one or more subsequent feature sets (e.g., subsequent reduced feature models). The initial feature set may include information determined to have a highest probability of enabling the classifier module of the mobile devices to conclusively determine whether a particular mobile device behavior, software application, or process is malicious/performance-degrading or benign. Each subsequent feature set may include information determined to have the next highest probability of conclusively determining that the mobile device behavior, software application, or process is malicious/performance-degrading or benign. Each subsequent feature set may include a larger dataset than its preceding feature set, and thus the performance and power consumption costs associated with applying the data/behavior models may increase progressively for each subsequent feature set.

In an aspect, the classifier module of the mobile device may include or implement progressive behavior models (or classifiers) that enable the mobile device processor to evaluate the mobile device behaviors in stages. For example, the classifier module may be configured to first apply a lean data/behavior model that includes the initial feature set, then model that include progressively larger feature sets until the classifier module determines that a mobile device behavior is benign or malicious/performance-degrading. The classifier module may then send the results of its operations and/or success rates associated with the application of each model to the network server. The network server may use such results to update the lean data/behavior models (e.g., the features sets included in each model, etc.), thereby refining the data and/or models based on the results/success rates of all reporting mobile devices. The network server may then make the updated lean data/behavior models available to mobile devices so they have access to the lean data/behavior models. In this manner, mobile devices can instantly benefit from the behaviors and conclusions of other mobile devices.

In an aspect, the network server may be configured to continuously update the online and offline classifiers, model generators, and/or cloud model. The network server may be configured to intelligently determine when the changes are substantial enough to warrant generating new models and when the changes may be ignored. For example, the network server may receive updates from many different mobile devices, perform machine learning operations to generate a first family of classifiers, determine whether there are enough changes to the generated first family of classifiers to warrant generating new models, determine which features in the generated first family of classifiers are the best features when it is determined that there are enough changes to the first family of classifiers, generate a second family of classifiers based on the best features, determine whether there are enough changes to the generated second family of classifiers, and generate/update mobile device classifier data/behavior models when it is determined that there are enough changes to the second family of classifiers.

In various aspects, the mobile device and/or network server may be configured to perform machine learning operations/algorithms to generate and/or execute one or more classifiers or data/behavior models. Generally, a learning algorithm has a learning phase in which a data/behavior model is generated and a prediction phase in which the generated model is executed or applied. In various aspects, a network server may be configured to generate the data/behavior model or classifier so that the learning phase does not consume mobile device processing and power resources, and is not otherwise a bottle neck. Various aspects may further include mobile devices configured to apply the data/behavior models or classifiers efficiently to reduce the performance impact and power consumption of the prediction phase.

In the various aspects, a computing device, such as a mobile device or a network server, may be configured to generate and apply a boosted decision tree (BDT) with reduced features model (RFM) to predict the features/entries of the training dataset that are most relevant for determining whether a mobile device behavior is benign, suspicious, or malicious/performance-degrading and/or to organize/order the features/entries/attributes by order of importance. In an aspect, the BDT-RFM may be an interpretable classification model or classifier from which it may be determined why an ordering/classification decision was made.

Various aspects may include a computing device configured to generate one or more classifiers in the form of a boosted decision tree (BDT) or a family of BDTs from behavior vectors generated by the observer and/or analyzer modules. In various aspects the computing device may be further configured to compute an answer ratio on the generated family of BDTs, and apply the computed answer ratio to organize/order the features/entries of the training dataset in order of their importance. In an aspect, the computing device may be configured to use the organized/ordered features and entries to build a second or subsequent family of classifiers, which may further predict which features/entries of the training dataset that are most relevant for determining whether a mobile device behavior is benign, suspicious, or malicious/performance-degrading.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 18 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

The network server 116 may send lean data/behavior models to the mobile device 102, which may receive and use lean data/behavior models to identify suspicious or performance-degrading mobile device behaviors, software applications, processes, etc. The network server 116 may also send classification and modeling information to the mobile devices 102 to replace, update, create and/or maintain mobile device data/behavior models.

The mobile device 102 may collect behavioral, state, classification, modeling, success rate, and/or statistical information in the mobile device 102, and send the collected information to the network server 116 (e.g., via the telephone network 104) for analysis. The network server 116 may use information received from the mobile device 102 to update or refine the lean data/behavior models or the classification/modeling information to include a further targeted and/or reduced subset of features.

Figure 2:
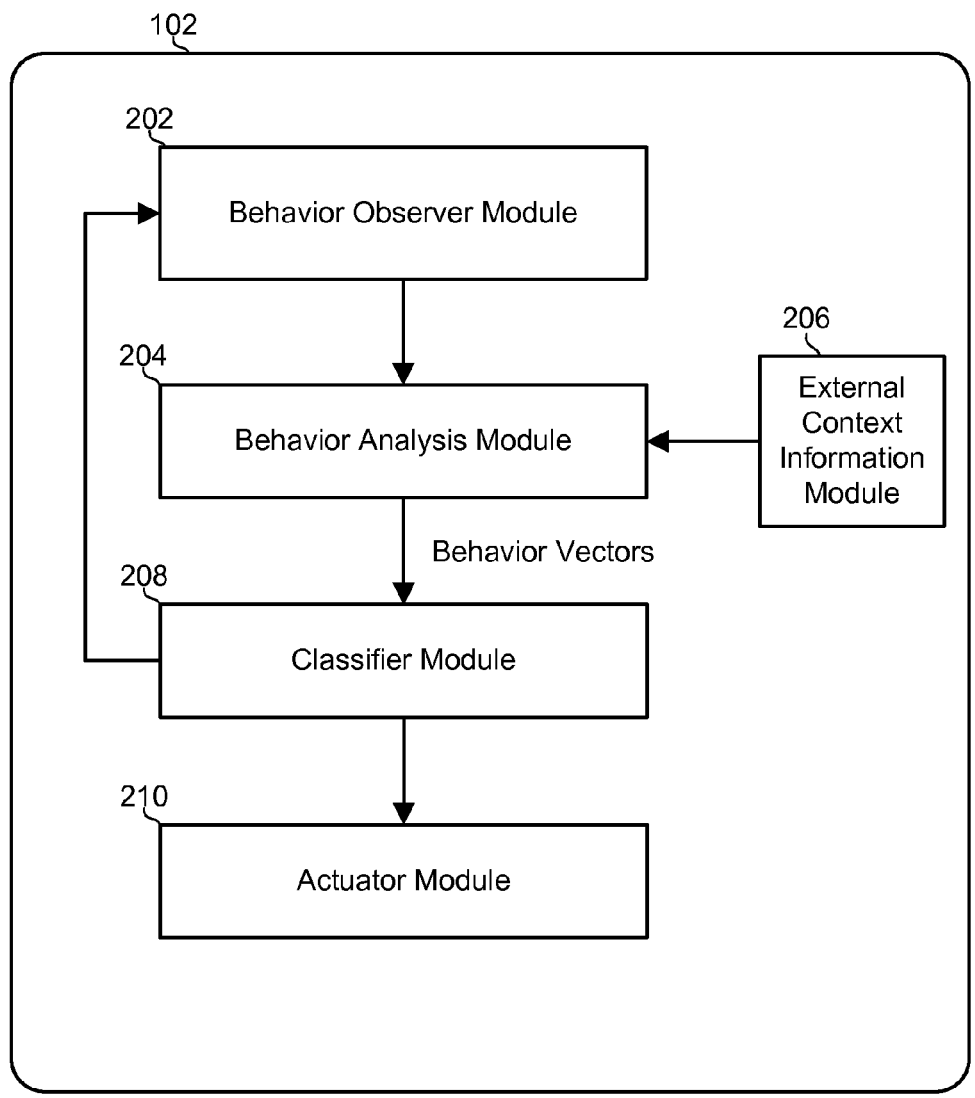
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, ect.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

The behavior analyzer module 204 and/or classifier module 208 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to the classifier module 208 for further analysis.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, or otherwise fix the identified problem.

When the classifier module 208 determines that a behavior, software application, or process is suspicious, the classifier module 208 may notify the behavior observer module 202, which may adjust the adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 3:
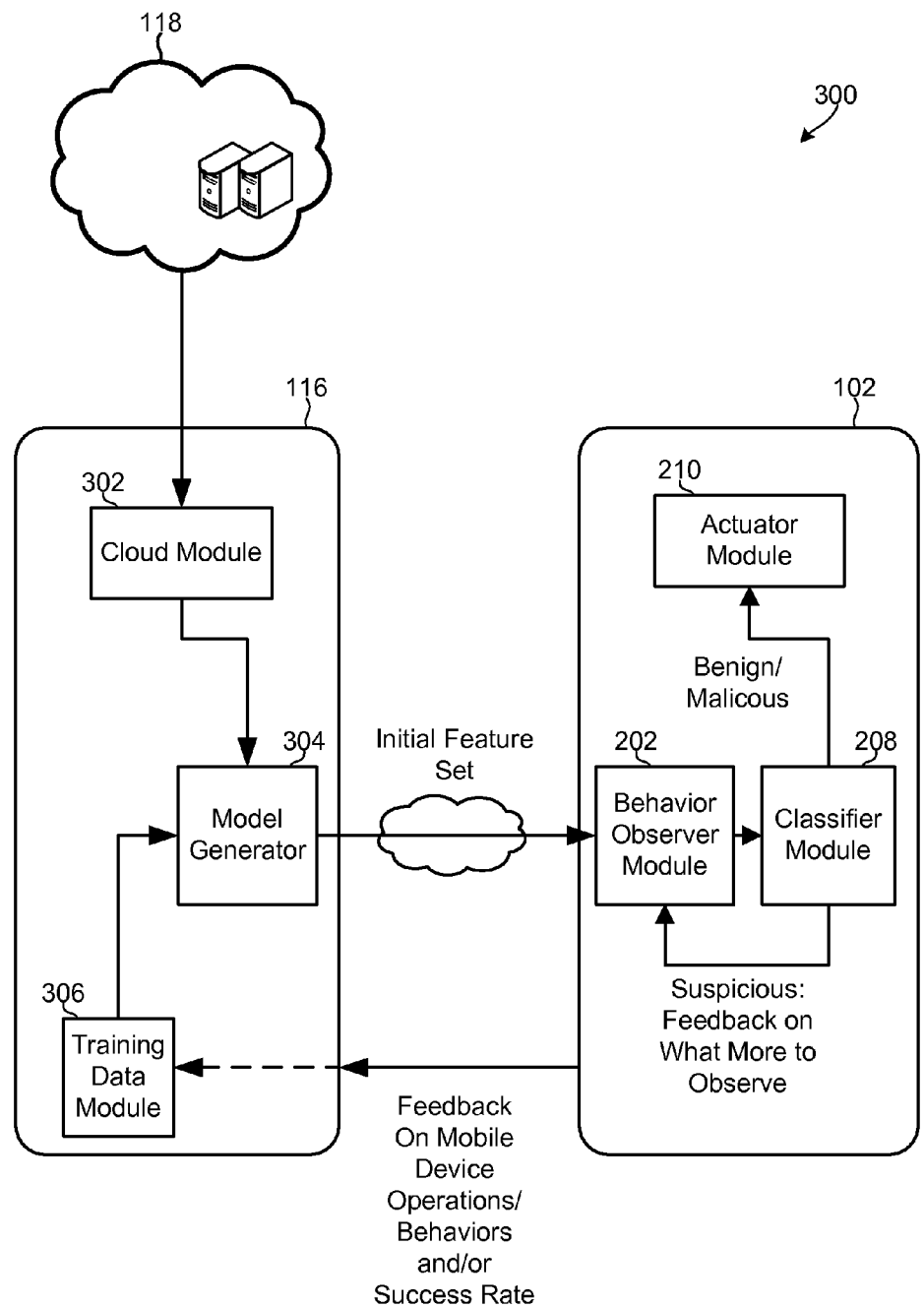
FIG. 3 is a block diagram illustrating example components and information flows in an aspect system with a network server configured in a cloud service/network to identify actively malicious or poorly written software applications and/or suspicious or performance-degrading mobile device behaviors on mobile devices.

FIG. 3 illustrates example components and information flows in an aspect system 300 that includes a network server 116 configured to work in conjunction with a cloud service/network 118 to intelligently and efficiently identify actively malicious or poorly written software applications and/or suspicious or performance-degrading mobile device behaviors on the mobile device 102 without consuming an excessive amount of processing, memory, or energy resources of the mobile device. In the example illustrated in FIG. 3, the network server 116 includes a cloud module 302, a model generator 304 module, and a training data module 306. The mobile device 102 includes a behavior observer module 202, a classifier module 208, and an actuator module 210. In an aspect, the classifier module 208 may be included in, or as part of, the behavior analyzer module 204 (illustrated in FIG. 2). In an aspect, the model generator 304 module may be a real-time online classifier.

The cloud module 302 may be configured to receive a large amount of information from a cloud service/network 118 and generate a full or robust data/behavior model that includes all or most of the features, data points, and/or factors that could contribute to the mobile device's degradation over time.

The model generator 304 module may generate lean data/behavior models based on full model generated in the cloud module 302. In an aspect, generating the lean data/behavior models may include generating one or more reduced feature models (RFMs) that include a subset of the features and data points included in the full model generated by the cloud module 302. In an aspect, the model generator 304 may generate a lean data/behavior model that includes an initial feature set (e.g., an initial reduced feature model) that includes information determined to have a highest probability of enabling the classifier module 208 to conclusively determine whether a particular mobile device behavior is benign or malicious/performance-degrading. The model generator 304 may send the generated lean models to the behavior observer module 202.

The behavior observer module 202 may monitor/observe mobile device behaviors based on the received model, generate observations, and send the observations to the classifier module 208. The classifier module 208 may perform real-time analysis operations, which may include applying data/behavior models to behavior information collected by the behavior observer module 202 to determine whether a mobile device behavior is benign, suspicious, or malicious/performance-degrading. The classifier module 208 may determine that a mobile device behavior is suspicious when the classifier module 208 does not have sufficient information to classify or conclusively determine that the behavior is either benign or malicious.

The classifier module 208 may be configured to communicate the results of its real-time analysis operations to the behavior observer module 202 when the classifier module 208 determines that a device behavior is suspicious. The behavior observer module 202 may adjust the granularity of its observations (i.e., the level of detail at which mobile device behaviors are observed) and/or change the behaviors that are observed based on information received from the classifier module 208 (e.g., based on the results of the real-time analysis operations), generate or collect new or additional behavior information, and send the new/additional information to the classifier module for further analysis/classification (e.g., in the form of new models). In this manner, the mobile device 102 may recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity.

The mobile device 102 may the send the results of its operations and/or success rates associated with the application of models to the network server 116. The network server 116 may generate training data (e.g., via the training data module 306) based on the results/success rates for use by the model generator 304. The model generator may generate updated models based on the training data, and send the updated models to the mobile device 102.

Figure 4:
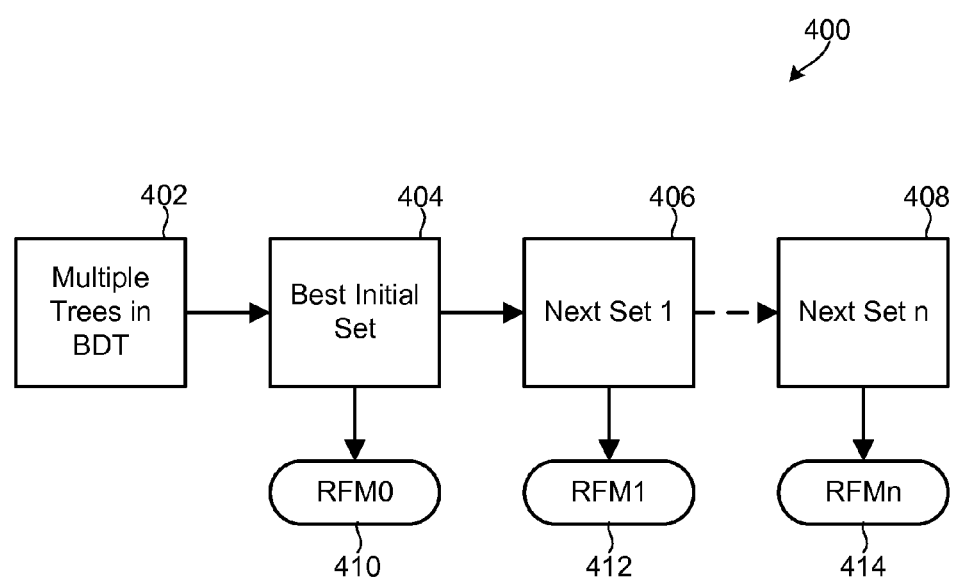
FIG. 4 is a process flow diagram illustrating an aspect method of generating one or more reduced feature models including subsets of the features and data points from a full feature model.

FIG. 4 illustrates an aspect method 400 of generating one or more reduced feature models (RFMs) to include a subset of the features and data points included in a full feature model (e.g., model generated in the cloud module 302, etc.). In various aspects, the method 400 may be performed in the cloud module 302, model generator 304, the classifier module 208, or any combination thereof. In block 402, a processor may perform a boosted division tree (BDT) algorithm (or other similar classification or decision-making algorithm) to build a decision tree (or other similar structures) from a large corpus of data (e.g., billons of datapoints, thousands of features, etc.) received from a cloud service/network 118. In block 404, the processor may generate an initial reduced feature set module (e.g., RFM0) 410 from the decision tree or structure. In various embodiments, the reduced feature set module (e.g., RFM0) 410 may be a classifier or a classifier module 208.

The initial reduced feature set (e.g., RFM0) 410 may include information determined to have a highest probability of enabling a behavior analyzer module 204 and/or a classifier module 208 to conclusively determine whether a particular mobile device behavior is malicious or benign. In block 406, the processor may generate a subsequent reduced feature set (e.g., RFM1) 412 from the decision tree or structure to include information determined to have the next highest probability of conclusively determining whether the mobile device behavior is malicious or benign. In block 408, the processor may generate additional subsequent feature sets (e.g., RFMn) 414 from the decision tree or structure.

Each subsequent feature set (e.g., RFM1-RFMn) may include a larger dataset than its preceding feature set. For example, if the decision tree or structure identified 1000 relevant factors, the initial reduced feature set (e.g., RFMO) may include 50 of the factors that are determined to have the highest probability of enabling the classifier module of the mobile device to conclusively determine whether a mobile device behavior is malicious or benign. The first subsequent reduced feature set (e.g., RFM1) may include the next 100 factors and a subsequent reduced feature set (e.g., RFMn) may include the remaining factors.

Figure 5:
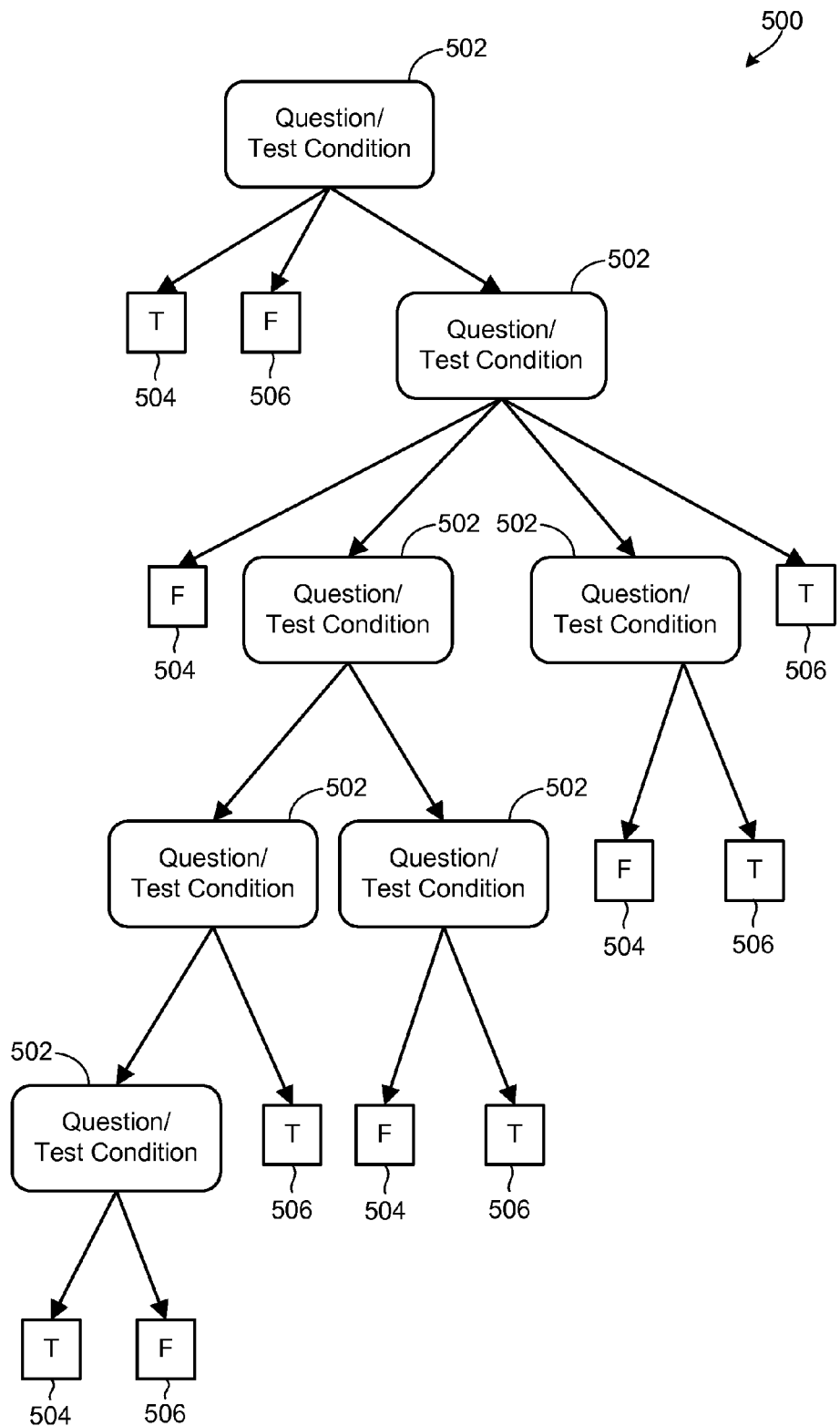
FIG. 5 is an illustration of a decision tree suitable for use as a lean mobile device classifier in various aspects.

FIG. 5 illustrates an example decision tree 500 suitable for identifying and/or grouping features that have the highest probability of enabling a classifier/analyzer module of a mobile device to conclusively determine whether a mobile device behavior, application, or process is malicious or benign in accordance with various aspects. Specifically, FIG. 5 illustrates that the decision tree 500 includes one or more decision nodes 502 that include a question or a test condition, the performance of which may result in either a definitive answer 504, 506 (e.g., true, false, malicious, benign, etc.) or to an indefinite answer (i.e. need more information to make a decision). When the result of the question/test condition is an indefinite answer, a processor may perform operations to answer another question or to test another test condition. The processor may traverse the decision tree 500 by performing operations for testing each test condition (or for determining an answer for each question) associated with each decision node 502 until reaching a sub-node that includes a definitive answer 504, 506. In an aspect, the processor may store/maintain a count of the number of decision nodes 502 traversed (i.e., questions asked, conditions tested, etc.) before arriving at the definitive answer 504, 506. In an aspect, the decision tree 500 may be generated and/or applied in a classifier module 208. In an aspect, the decision tree 500 may be a classifier included in a classifier module 208 and/or a behavior analyzer module 204.

Figure 6:
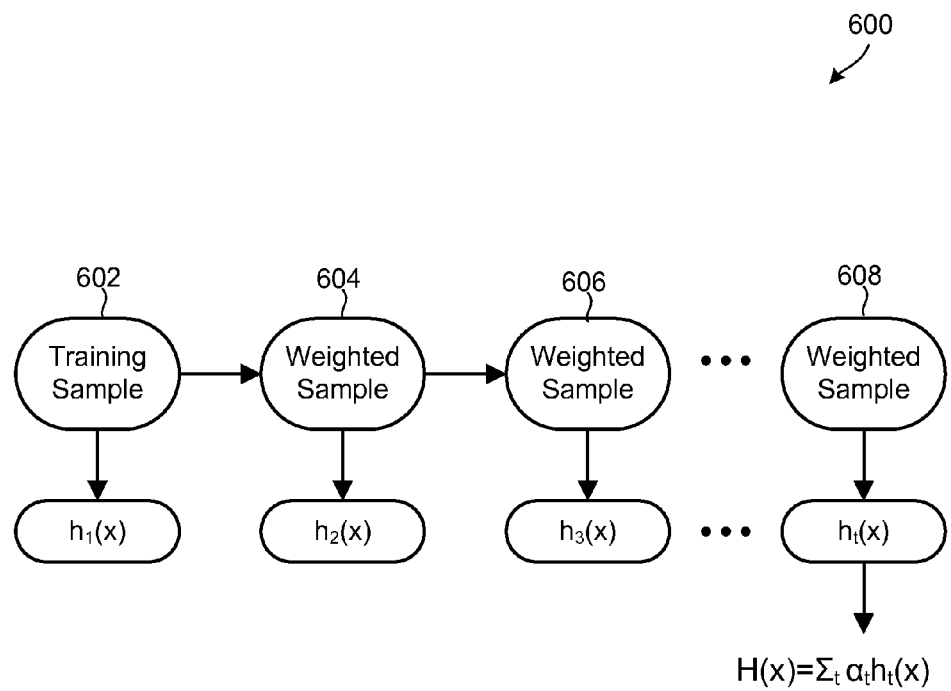
FIG. 6 is a process flow diagram illustrating a boosting method suitable for generating a boosted decision tree (BDT)/classifier in accordance with various embodiments.

FIG. 6 illustrates a boosting method 600 suitable for generating a boosted decision tree/classifier in accordance with various aspects. In operation 602, a processor may generate and/or execute a decision tree/classifier, collect a training sample from the execution of the decision tree/classifier, and generate a new classifier model (h1($x$)) based on the training sample. The training sample may include information collected from previous observations or analysis of mobile device behaviors, software applications, or processes in the mobile device. The training sample and/or new classifier model (h1($x$)) may be generated based the types of question or test conditions included in previous classifiers and/or based on accuracy or performance characteristics collected from the execution/application of previous data/behavior models or classifiers in a classifier module 208 of a behavior analyzer module 204. In operation 604, the processor may boost (or increase) the weight of the entries that were misclassified by the generated decision tree/classifier (h1($x$)) to generate a second new tree/classifier (h2($x$)). In an aspect, the training sample and/or new classifier model (h2($x$)) may be generated based on the mistake rate of a previous execution or use (h1($x$)) of a classifier. In an aspect, the training sample and/or new classifier model (h2($x$)) may be generated based on attributes determined to have that contributed to the mistake rate or the misclassification of data points in the previous execution or use of a classifier.

In an aspect, the misclassified entries may be weighted based on their relatively accuracy or effectiveness. In operation 606, the processor may boost (or increase) the weight of the entries that were misclassified by the generated second tree/classifier (h2($x$)) to generate a third new tree/classifier (h3($x$)). In operation 608, the operations of 604-606 may be repeated to generate "t" number of new tree/classifiers (h$_t$($x$)).

By boosting or increasing the weight of the entries that were misclassified by the first decision tree/classifier (h1($x$)), the second tree/classifier (h2(x)) may more accurately classify the entities that were misclassified by the first decision tree/classifier (h1(x)), but may also misclassify some of the entities that where correctly classified by the first decision tree/classifier (h1(x)). Similarly, the third tree/classifier (h3 (x)) may more accurately classify the entities that were misclassified by the second decision tree/classifier (h2(x)) and misclassify some of the entities that where correctly classified by the second decision tree/classifier (h2(x)). That is, generating the family of tree/classifiers h1(x)-h$_f$(x) may not result in a system that converges as a whole, but results in a number of decision trees/classifiers that may be executed in parallel.

Figure 7:
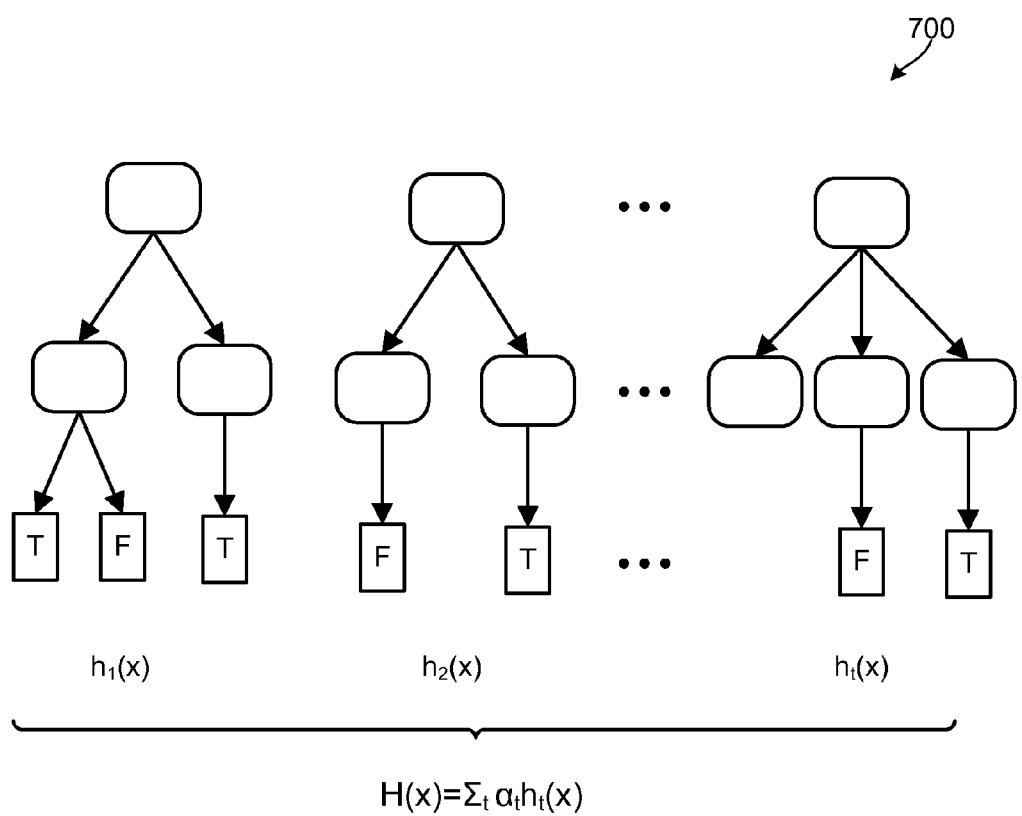
FIG. 7 is an illustration of a plurality of parallel decision trees generated via the performance of the boosting method in accordance with various aspects.

FIG. 7 illustrates a plurality of parallel decision trees 700 that may be generated via the performance of the boosting method 600 discussed above. In an aspect, each of the decision trees may be a classifier. In an aspect, the same/single behavior vector may be run on each decision tree. In an aspect, the system may be configured to generate a tread for each decision tree in the plurality of parallel decision trees. In an aspect, the generated treads may process the same behavior vector in parallel (e.g., via a multicore processor).

Various aspects may be configured to compute an exclusive answer ratio, an answer ratio, and/or a weighted answer ratio on the family of boosted decision trees via the following formulas:

$$\text{Exclusive Answer Ratio: } XAR(N_1) = \frac{\Sigma_{L_k} \in \text{Leaves}(N_i) W(L_k)}{\text{depth}(N_i)}$$

$$\text{Answer Ratio:} AR(f, T_j) = \Sigma_{\forall N_i \in T_j \& \& F(N_i) = f}[XAR(N_i) + \Sigma_{\forall C_j \in Child(N_i)} AR(C_i)]$$

$$\text{Weighted Answer Ratio:} WAR(f) = \Sigma_{\forall T_j \in T\alpha_j} * AR(f, T_j)$$

where:
Ni is a unique label per node;
F(Ni) is a feature associated with the node Ni;
Leaves(Ni) are children of node Ni that are leaves (i.e., a definite answer);
Child(Ni) are children of node Ni which are not leaves (i.e., indefinite answer);
Depth(Ni) is the depth of node Ni in one tree Tj;
T is a collection of trees in the BDT;
W(Lk) is a weight of leaf node Lk;
αj is weight of each tree Tj; and
f is one feature in the Tj.

Figure 8:
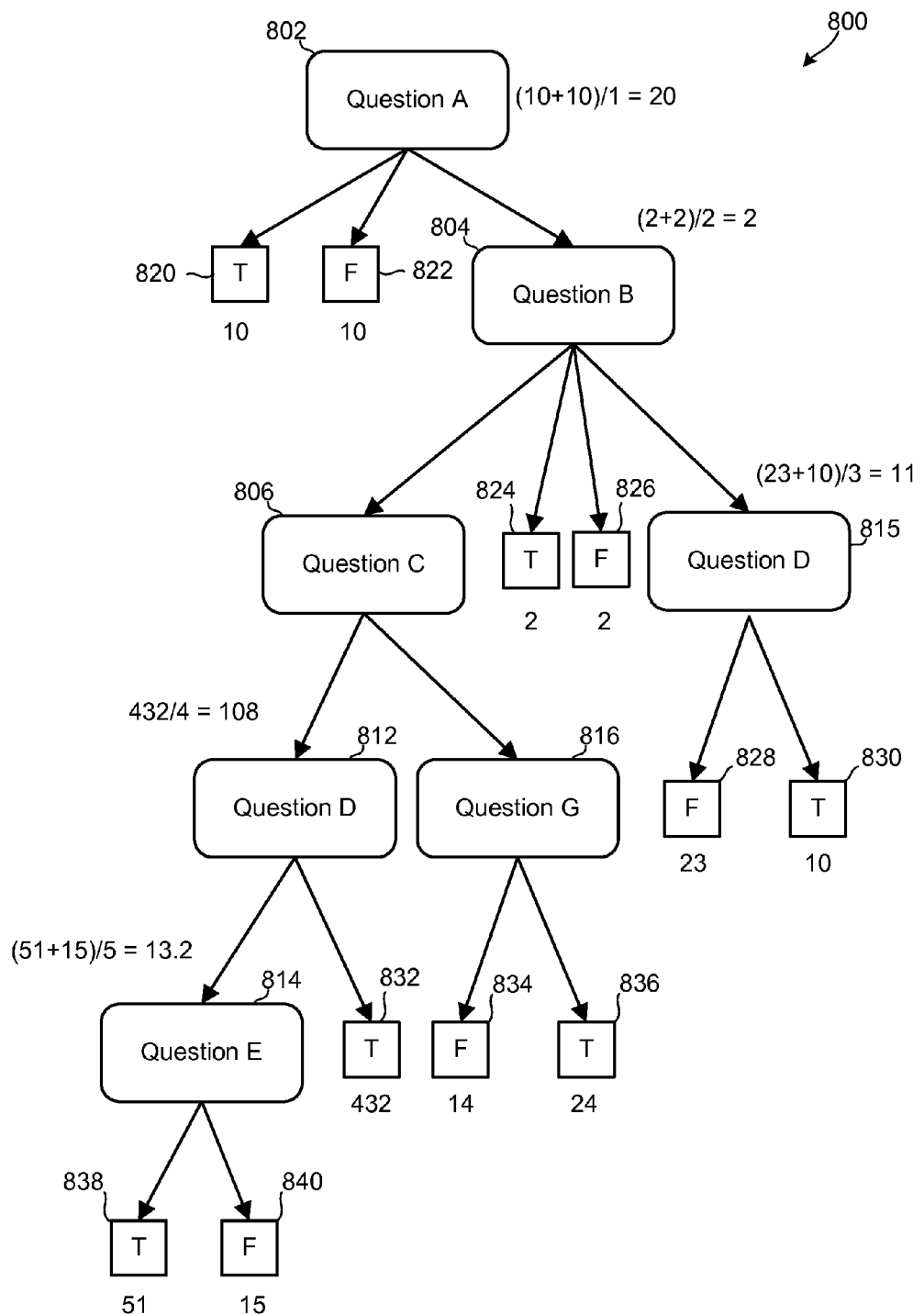
FIG. 8 is an illustration of an example boosted decision tree (BDT) generated by an aspect server processor and which may be used for computing an exclusive answer ratio in accordance with an aspect.

FIG. 8 illustrates an example boosted decision tree (BDT) 800 that may be generated by an aspect server processor and used for computing an exclusive answer ratio in accordance with an aspect. In various aspects, the boosted decision tree 800 may be generated by a cloud module 302 and/or model generator 304.

In the example illustrated in FIG. 8, the boosted decision tree 800 includes a plurality of decision nodes 802-816 that include a question or a test condition, that when executed or performed by a processor, may result in either a definitive answer (e.g., true, false, malicious, benign, etc.) included in a leaf node 820-840 or to an indefinite answer (e.g., suspicious) leading to another decision node 804-814. Each leaf node 820-840 may be associated with a weight.

In an aspect, the weight associated with a leaf node 820-840 may be computed based on information collected from previous observations or analysis of mobile device behaviors, software applications, or processes in the mobile device. In an aspect, the weight associated with a leaf node 820-840 may be computed based on how many units of the corpus of data (e.g., cloud corpus of data or behavior vectors) used to build the boosted decision tree 800 actually reached an answer provide by that leaf node 820-840. That is, the weight associated with a leaf node 820-840 may be computed based on the number of times a definitive answer was provided by the leaf node 820-840 for the corpus of data used to build the boosted decision tree 800.

In an aspect, the server processor may compute the exclusive answer ratio based on the number of decision nodes 802-816 traversed (i.e., questions asked, conditions tested, etc.) before arriving at the definitive answer provided by the leaf node 820-840. In an aspect, the exclusive answer ratio may be computed as a ratio between a value of an answer provided by question (i.e., how much knowledge is gained from answering a question) divided by the number of decision nodes 802-816 traversed before arriving at the definitive answer provided by the leaf node 820-840.

In the example illustrated in FIG. 8, leaf node 838 is associated with a weight of 51 and leaf node 840 is associated with a weight of 15. That is, on 66 instances (i.e., 51+15), a definitive answer was provided by answering "Question E" of decision node 814. Since traversing the boosted decision tree 800 to arrive at "Question E" of decision node 814 may require traversing and receiving incomplete answers form each questions A-E of decision nodes 802-812, the cost associated with asking "Question E" of decision node 814 to arrive at the 61 instances of definitive answers is the cost associated with evaluating five (5) test conditions or answering questions. Thus, the exclusive answer ratio of decision node 814 is (51+15)/5=13.2. Similarly, the exclusive answer ratio of decision node 812 is 432/4=108, and so on.

In an aspect, more than one of the plurality of decision nodes 802-816 may include the same question/test condition with varying results. For example, FIG. 8 illustrates that both decision node 812 and decision node 815 include the same question (i.e., Question D) with varying results.

In an aspect, the values exclusive answer ratios associated with two or more decision nodes 802-816 may be summed across multiple trees or branches.

Figure 9:
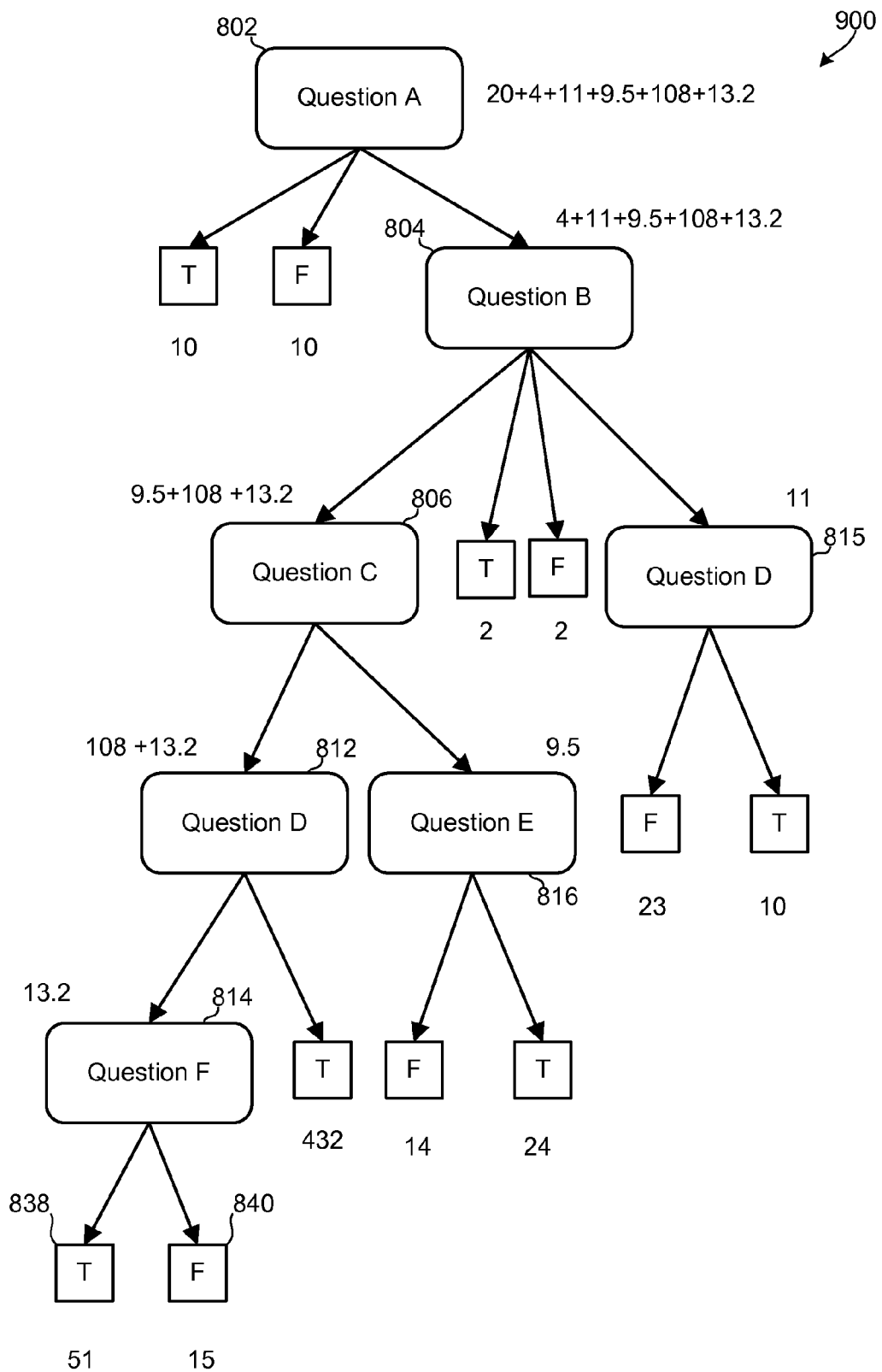
FIG. 9 is an illustration of an example boosted decision tree (BDT) generated by an aspect server processor and which may be used for computing an answer ratio in accordance with an aspect

FIG. 9 illustrates an example boosted decision tree (BDT) 900 that may be generated by an aspect server processor and used for computing an answer ratio in accordance with an aspect. In various aspects, the boosted decision tree 800 may be generated by a cloud module 302 and/or model generator 304.

In an aspect, the answer ratio may be computed as an exclusive answer ratio in which the computed weights are cumulated upward. For example, the answer ratio of decision node 812 may be computed as exclusive answer ratio of decision node 812 (432/4=108) plus the exclusive answer ratio of decision node 814 ((51+15)15=13.2).

In an aspect, a sever processor may be configured to generate a new boosted decision tree (BDT) by boosting (or increasing) the weight of the entries that were misclassified by a first decision tree/classifier (h1(x)) based on the answer ratio associated with that entry to generate a second new tree/classifier (h2(x)) in which the features/entries of the training dataset are organized in order of their importance. Decision nodes having a higher weight or answer ratio may be located higher in the decision tree than decision nodes having a lower weight or answer ratio. In this manner, various aspects may generate a more balanced boosted decision tree (BDT) in which the most important questions are asked first.

Finally, the answer ratio for each feature may be summed a number of times as the same feature appears multiple times in different decision tress, and even in different branches of the same tree. The answer ratio of a feature may be weighted by the weight of the BDT when the Weighted Answer Ratio is cumulated across the family of BDTs.

In an aspect, a server processor may be configured to generate a boosted decision tree (BDT) that includes a reduced number of nodes (i.e., decision nodes, leaf nodes, etc.) based on a reduced features model and/or the answer ratios associated with the nodes of a previous analysis of the more robust decision tree.

In an aspect, a sever processor may be configured to build the family of BDTs from all training data and all attributes, choose best set of attributes (e.g., via evaluation of answer ratios, etc.), generate a new smaller family of BDTs using only the values of the chosen attributes, and send the smaller family of BDTs or classifiers (or a mobile device model generated from the smaller family of BDTs/classifiers) to a mobile device. The mobile device processor may be configured to apply the smaller family of trees/classifiers (or the mobile device model) for constant or routine monitoring/observation of mobile device behaviors, and apply a more robust tree, classifier or model when the mobile device processor determines that a mobile device behavior is suspicious.

Figure 10:
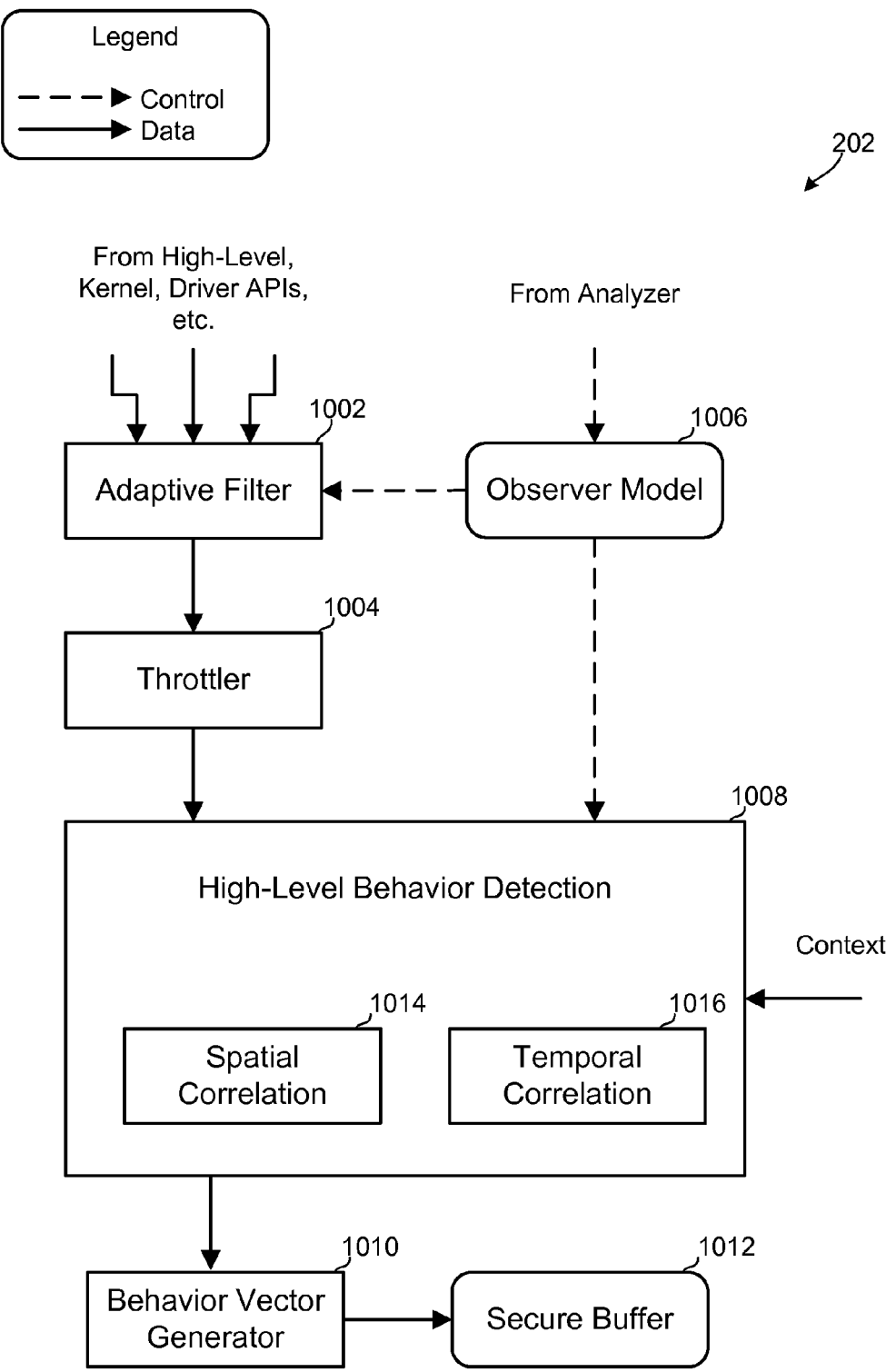
FIG. 10 is a block diagram illustrating example logical components and information flows in an observer module configured to perform dynamic and adaptive observations in accordance with an aspect.

FIG. 10 illustrates example logical components and information flows in a behavior observer module 202 of a computing system configured to perform dynamic and adaptive observations in accordance with an aspect. The behavior observer module 202 may include an adaptive filter module 1002, a throttle module 1004, an observer mode module 1006, a high-level behavior detection module 1008, a behavior vector generator 1010, and a secure buffer 1012. The high-level behavior detection module 1008 may include a spatial correlation module 1014 and a temporal correlation module 1016.

The observer mode module 1006 may receive control information from various sources, which may include an analyzer unit (e.g., the behavior analyzer module 204 described above with reference to FIG. 2) and/or an application API. The observer mode module 1006 may send control information pertaining to various observer modes to the adaptive filter module 1002 and the high-level behavior detection module 1008.

The adaptive filter module 1002 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 1004, which may be responsible for controlling the amount of information flowing from the filter to ensure that the high-level behavior detection module 1008 does not become flooded or overloaded with requests or information.

The high-level behavior detection module 1008 may receive data/information from the throttle module 1004, control information from the observer mode module 1006, and context information from other components of the mobile device. The high-level behavior detection module 1008 may use the received information to perform spatial and temporal correlations to detect or identify high level behaviors that may cause the device to perform at sub-optimal levels. The results of the spatial and temporal correlations may be sent to the behavior vector generator 1010, which may receive the correlation information and generate a behavior vector that describes the behaviors of particular process, application, or sub-system. In an aspect, the behavior vector generator 1010 may generate the behavior vector such that each high-level behavior of a particular process, application, or sub-system is an element of the behavior vector. In an aspect, the generated behavior vector may be stored in a secure buffer 1012. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 1008 may receive information from the throttle module 1004, the observer mode module 1006, and context information received from other components (e.g., sensors) of the mobile device. As an example, a high-level behavior detection module 1008 performing temporal correlations might detect that a camera has been used and that the mobile device is attempting to upload the picture to a server. The high-level behavior detection module 1008 may also perform spatial correlations to determine whether an application on the mobile device took the picture while the device was holstered and attached to the user's belt. The high-level behavior detection module 1008 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 1008 may recognize this as a potentially threatening behavior and initiate an appropriate response (e.g., shutting off the camera, sounding an alarm, etc.).

In an aspect, the behavior observer module 202 may be implemented in multiple parts.

Figure 11:
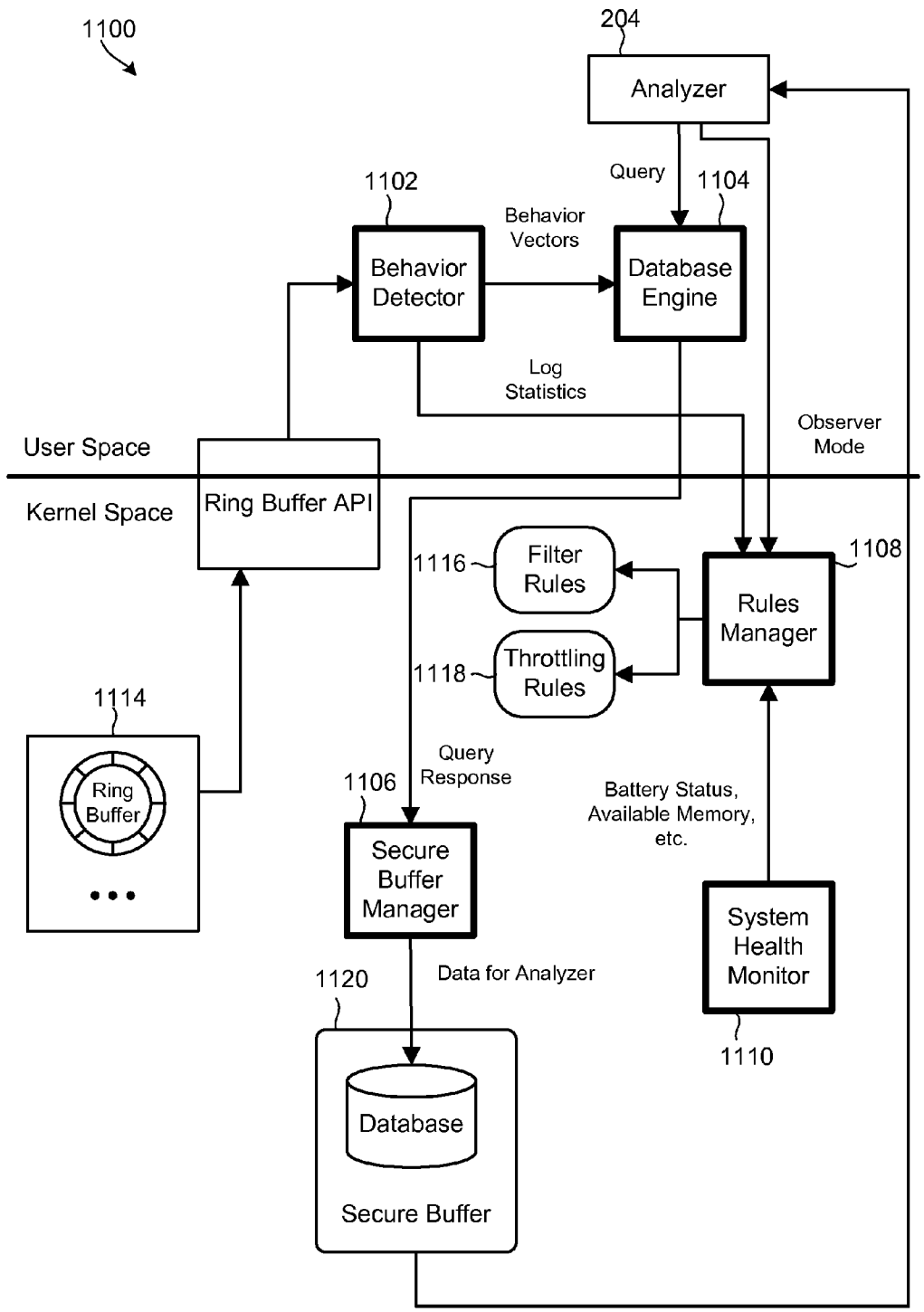
FIG. 11 is a block diagram illustrating logical components and information flows in a computing system implementing observer daemons in accordance with another aspect.

FIG. 11 illustrates logical components and information flows in a computing system 1100 implementing an aspect observer daemon. In the example illustrated in FIG. 11, the computing system 1100 includes a behavior detector 1102 module, a database engine 1104 module, and a behavior analyzer module 204 in the user space, and a ring buffer 1114, a filter rules 1116 module, a throttling rules 1118 module, and a secure buffer 1120 in the kernel space. The computing system 1100 may further include an observer daemon that includes the behavior detector 1102 and the database engine 1104 in the user space, and the secure buffer manager 1106, the rules manager 1108, and the system health monitor 1110 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 12:
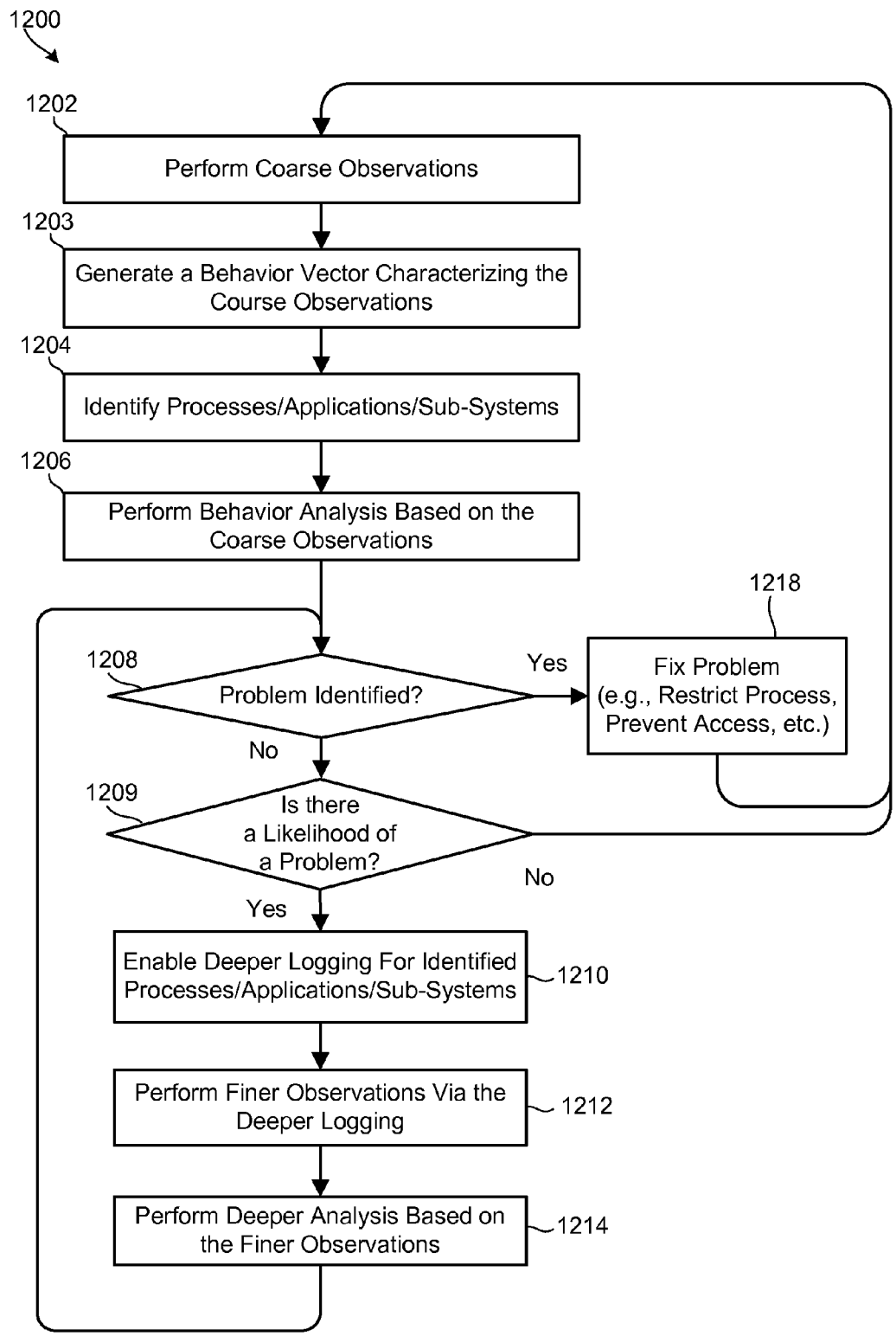
FIG. 12 is a process flow diagram illustrating an aspect method for performing adaptive observations on mobile devices.

FIG. 12 illustrates an example method 1200 for performing dynamic and adaptive observations in accordance with an aspect. In block 1202, the mobile device processor may perform coarse observations by monitoring/observing a subset of large number factors/behaviors that could contribute to the mobile device's degradation. In block 1203, the mobile device processor may generate a behavior vector characterizing the coarse observations and/or the mobile device behavior based on the coarse observations. In block 1204, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 1206, the mobile device processor may perform behavioral analysis operations based on the coarse observations. In an aspect, as part of blocks 1203 and 1204, the mobile device processor may perform one or more of the operations discussed above with reference to FIGS. 2-9.

In determination block 1208, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 1208="Yes"), in block 1218, the processor may initiate a process to correct the behavior and return to block 1202 to perform additional coarse observations.

When the mobile device processor determines that the suspicious behaviors or potential problems can not be identified and/or corrected based on the results of the behavioral analysis (i.e., determination block 1208="No"), in determination block 1209 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 1209="No"), the processor may return to block 1202 to perform additional coarse observations.

When the mobile device processor determines that there is a likelihood that suspicious behaviors or potential problems exist and/or are detectable (i.e., determination block 1209="Yes"), in block 1210, the mobile device processor may perform deeper logging/observations or final logging on the identified subsystems, processes or applications. In block 1212, the mobile device processor may perform deeper and more detailed observations on the identified subsystems, processes or applications. In block 1214, the mobile device processor may perform further and/or deeper behavioral analysis based on the deeper and more detailed observations. In determination block 1208, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 1208="No"), the processor may repeat the operations in blocks 1210-1214 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 1208="Yes"), in block 1218, the mobile device processor may perform operations to correct the problem/behavior, and the processor may return to block 1202 to perform additional operations.

In an aspect, as part of blocks 1202-1218 of method 1200, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 13:
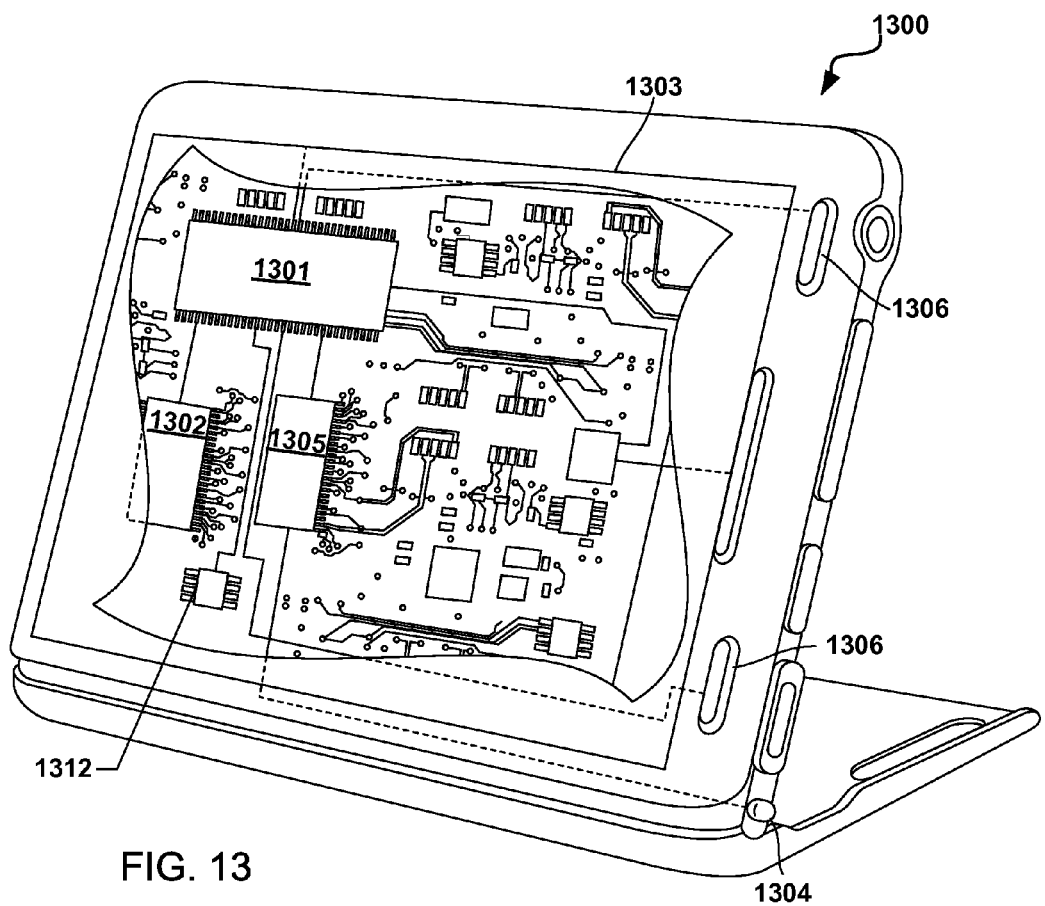
FIG. 13 is a component block diagram of a mobile device suitable for use in an aspect.

The various aspects may be implemented on a variety of mobile computing devices, an example of which is illustrated in FIG. 13 in the form of a smartphone. A smartphone 1300 may include a processor 1301 coupled to internal memory 1302, a display 1303, and to a speaker. Additionally, the smartphone 1300 may include an antenna 1304 for sending and receiving electromagnetic radiation that may be connected to a wireless data link and/or cellular telephone transceiver 1305 coupled to the processor 1301. Smartphone 1300 typically also include menu selection buttons or rocker switches 1306 for receiving user inputs.

A typical smartphone 1300 also includes a sound encoding/decoding (CODEC) circuit 1312, which digitizes sound received from a microphone into data packets suitable for wireless transmission and decodes received sound data packets to generate analog signals that are provided to the speaker to generate sound. Also, one or more of the processor 1301, wireless transceiver 1305 and CODEC 1312 may include a digital signal processor (DSP) circuit (not shown separately).

Figure 14:
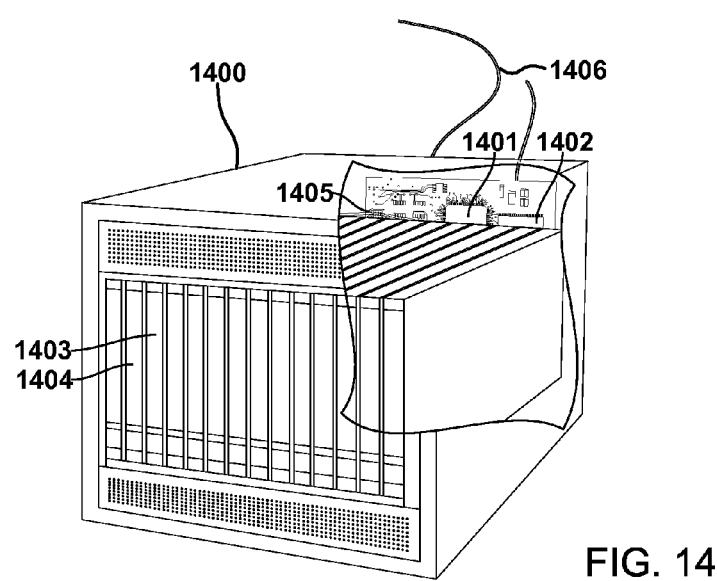
FIG. 14 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers.

The processors 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1302, 1402, 1403 before they are accessed and loaded into the processor 1301, 1401. The processor 1301, 1401 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of generating data models in a communication system, comprising:
   applying machine learning techniques to generate a first family of classifier models using a boosted decision tree to describe a corpus of behavior vectors;
   computing an exclusive answer ratio for one or more nodes of the boosted decision tree; and
   determining which factors in the first family of classifier models have a high probability of enabling a mobile device to conclusively determine whether a mobile device behavior is not benign based on computed exclusive answer ratios.

2. The method of claim 1, further comprising:
   applying the factors to the corpus of behavior vectors to generate a second family of classifier models that identify fewer data points as being relevant for enabling the mobile device to conclusively determine whether the mobile device behavior is not benign; and
   generating a mobile device classifier based on the second family of classifier models.

3. The method of claim 2, further comprising:
   sending the mobile device classifier to a mobile computing device.

4. The method of claim 3, further comprising:
   receiving the mobile device classifier in a device processor of the mobile computing device; and
   classifying in the device processor a behavior of the mobile computing device based on the received mobile device classifier.

5. A communication system, comprising:
   a server comprising:
      means for applying machine learning techniques to generate a first family of classifier models using a boosted decision tree to describe a corpus of behavior vectors;
      means for computing an exclusive answer ratio for one or more nodes of the boosted decision tree;
      means for determining which factors in the first family of classifier models have a high probability of enabling a mobile device to conclusively determine whether a mobile device behavior is not benign based on computed exclusive answer ratios;
      means for applying the factors to the corpus of behavior vectors to generate a second family of classifier models that identify fewer data points as being relevant for enabling the mobile device to conclusively determine whether the mobile device behavior is not benign;
      means for generating a mobile device classifier based on the second family of classifier models; and
      means for sending the generated mobile device classifier to the mobile device; and
   a mobile computing device, comprising:
      means for sending behavior vectors to the server;
      means for receiving the mobile device classifier from the server; and
      means for classifying a behavior of the mobile computing device based on the received mobile device classifier.

6. A communication system, comprising:
   a server comprising a server processor configured with server-executable instructions to perform operations comprising:
      applying machine learning techniques to generate a first family of classifier models using a boosted decision tree to describe a corpus of behavior vectors;
      computing an exclusive answer ratio for one or more nodes of the boosted decision tree;
      determining which factors in the first family of classifier models have a high probability of enabling a mobile device to conclusively determine whether a mobile device behavior is not benign based on computed exclusive answer ratios;
      applying the factors to the corpus of behavior vectors to generate a second family of classifier models that identify fewer data points as being relevant for enabling the mobile device to conclusively determine whether the mobile device behavior is not benign;
      generating a mobile device classifier based on the second family of classifier models; and
      sending the generated mobile device classifier to the mobile device; and
   a mobile computing device comprising a device processor configured with processor-executable instructions to perform operations comprising:
      sending behavior vectors to the server;
      receiving the mobile device classifier from the server; and
      classifying a behavior of the mobile computing device based on the received mobile device classifier.

7. A server, comprising:
   means for applying machine learning techniques to generate a first family of classifier models using a boosted decision tree to describe a corpus of behavior vectors;
   means for computing an exclusive answer ratio for one or more nodes of the boosted decision tree; and
   means for determining which factors in the first family of classifier models have a high probability of enabling a mobile device to conclusively determine whether a mobile device behavior is not benign based on computed exclusive answer ratios.

8. The server of claim 7, wherein further comprising:
   means for applying the factors to the corpus of behavior vectors to generate a second family of classifier models that identify fewer data points as being relevant for enabling the mobile device to conclusively determine whether the mobile device behavior is not benign; and
   means for generating a mobile device classifier based on the second family of classifier models.

9. The server of claim 8, wherein further comprising:
   means for sending the generated mobile device classifier to a mobile computing device.

10. A server, comprising:
    a processor configured with processor-executable instructions to perform operations comprising:
       applying machine learning techniques to generate a first family of classifier models using a boosted decision tree to describe a corpus of behavior vectors;
       computing an exclusive answer ratio for one or more nodes of the boosted decision tree; and
       determining which factors in the first family of classifier models have a high probability of enabling a mobile device to conclusively determine whether a mobile device behavior is not benign based on computed exclusive answer ratios.

11. The server of claim 10, wherein the processor is configured with processor-executable instructions to perform operations further comprising:
applying the factors to the corpus of behavior vectors to generate a second family of classifier models that identify fewer data points as being relevant for enabling the mobile device to conclusively determine whether the mobile device behavior is not benign; and
generating a mobile device classifier based on the second family of classifier models.

12. The server of claim 11, wherein the processor is configured with processor-executable instructions to perform operations further comprising:
sending the generated mobile device classifier to a mobile computing device.

13. A non-transitory computer readable storage medium having stored thereon server-executable software instructions configured to cause a server processor to perform operations for generating data models in a communication system, comprising:
applying machine learning techniques to generate a first family of classifier models using a boosted decision tree to describe a corpus of behavior vectors;
computing an exclusive answer ratio for one or more nodes of the boosted decision tree; and
determining which factors in the first family of classifier models have a high probability of enabling a mobile device to conclusively determine whether a mobile device behavior is not benign based on the computed exclusive answer ratios.

14. The non-transitory computer readable storage medium of claim 13, wherein the stored server-executable software instructions are configured to cause the server processor to perform operations further comprising:
applying the factors to the corpus of behavior vectors to generate a second family of classifier models that identify fewer data points as being relevant for enabling the mobile device to conclusively determine whether the mobile device behavior is not benign; and
generating a mobile device classifier based on the second family of classifier models.

15. The non-transitory computer readable storage medium of claim 14, wherein the stored server-executable software instructions are configured to cause the server processor to perform operations further comprising:
sending the generated mobile device classifier to a mobile computing device.

16. A method of generating data models in a communication system, comprising:
applying machine learning techniques to generate a first family of classifier models using a boosted decision tree to describe a corpus of behavior vectors;
computing an answer ratio for one or more nodes of the boosted decision tree; and
determining which factors in the first family of classifier models have a high probability of enabling a mobile device to conclusively determine whether a mobile device behavior is not benign based on computed answer ratios.

17. The method of claim 16, further comprising:
applying the factors to the corpus of behavior vectors to generate a second family of classifier models that identify fewer data points as being relevant for enabling the mobile device to conclusively determine whether the mobile device behavior is not benign; and
generating a mobile device classifier based on the second family of classifier models.

18. The method of claim 17, further comprising:
sending the mobile device classifier to a mobile computing device.

19. The method of claim 18, further comprising:
receiving the mobile device classifier in a device processor of the mobile computing device; and
classifying in the device processor a behavior of the mobile computing device based on the received mobile device classifier.

20. A communication system, comprising:
a server comprising:
means for applying machine learning techniques to generate a first family of classifier models using a boosted decision tree to describe a corpus of behavior vectors;
means for computing an answer ratio for one or more nodes of the boosted decision tree;
means for determining which factors in the first family of classifier models have a high probability of enabling a mobile device to conclusively determine whether a mobile device behavior is not benign based on computed answer ratios;
means for applying the factors to the corpus of behavior vectors to generate a second family of classifier models that identify fewer data points as being relevant for enabling the mobile device to conclusively determine whether the mobile device behavior is not benign;
means for generating a mobile device classifier based on the second family of classifier models; and
means for sending the generated mobile device classifier to the mobile device; and
a mobile computing device, comprising:
means for sending behavior vectors to the server;
means for receiving the mobile device classifier from the server; and
means for classifying a behavior of the mobile computing device based on the received mobile device classifier.

21. A communication system, comprising:
a server comprising a server processor configured with server-executable instructions to perform operations comprising:
applying machine learning techniques to generate a first family of classifier models using a boosted decision tree to describe a corpus of behavior vectors;
computing an answer ratio for one or more nodes of the boosted decision tree;
determining which factors in the first family of classifier models have a high probability of enabling a mobile device to conclusively determine whether a mobile device behavior is not benign based on computed answer ratios;
applying the factors to the corpus of behavior vectors to generate a second family of classifier models that identify fewer data points as being relevant for enabling the mobile device to conclusively determine whether the mobile device behavior is not benign;
generating a mobile device classifier based on the second family of classifier models; and
sending the generated mobile device classifier to the mobile device; and
a mobile computing device comprising a device processor configured with processor-executable instructions to perform operations comprising:
sending behavior vectors to the server;
receiving the mobile device classifier from the server; and classifying a behavior of the mobile computing device based on the received mobile device classifier.

22. A server, comprising:
means for applying machine learning techniques to generate a first family of classifier models using a boosted decision tree to describe a corpus of behavior vectors;
means for computing an answer ratio for one or more nodes of the boosted decision tree; and
means for determining which factors in the first family of classifier models have a high probability of enabling a mobile device to conclusively determine whether a mobile device behavior is not benign based on computed answer ratios.

23. The server of claim 22, wherein further comprising:
means for applying the factors to the corpus of behavior vectors to generate a second family of classifier models that identify fewer data points as being relevant for enabling the mobile device to conclusively determine whether the mobile device behavior is not benign; and
means for generating a mobile device classifier based on the second family of classifier models.

24. The server of claim 23, wherein further comprising:
means for sending the generated mobile device classifier to a mobile computing device.

25. A server, comprising:
a processor configured with processor-executable instructions to perform operations comprising:
applying machine learning techniques to generate a first family of classifier models using a boosted decision tree to describe a corpus of behavior vectors;
computing an answer ratio for one or more nodes of the boosted decision tree; and
determining which factors in the first family of classifier models have a high probability of enabling a mobile device to conclusively determine whether a mobile device behavior is not benign based on computed answer ratios.

26. The server of claim 25, wherein the processor is configured with processor-executable instructions to perform operations further comprising:
applying the factors to the corpus of behavior vectors to generate a second family of classifier models that identify fewer data points as being relevant for enabling the mobile device to conclusively determine whether the mobile device behavior is not benign; and
generating a mobile device classifier based on the second family of classifier models.

27. The server of claim 26, wherein the processor is configured with processor-executable instructions to perform operations further comprising:
sending the generated mobile device classifier to a mobile computing device.

28. A non-transitory computer readable storage medium having stored thereon server-executable software instructions configured to cause a server processor to perform operations for generating data models in a communication system, comprising:
applying machine learning techniques to generate a first family of classifier models using a boosted decision tree to describe a corpus of behavior vectors;
computing an answer ratio for one or more nodes of the boosted decision tree; and
determining which factors in the first family of classifier models have a high probability of enabling a mobile device to conclusively determine whether a mobile device behavior is not benign based on computed answer ratios.

29. The non-transitory computer readable storage medium of claim 28, wherein the stored server-executable software instructions are configured to cause the server processor to perform operations further comprising:
applying the factors to the corpus of behavior vectors to generate a second family of classifier models that identify fewer data points as being relevant for enabling the mobile device to conclusively determine whether the mobile device behavior is not benign; and
generating a mobile device classifier based on the second family of classifier models.

30. The non-transitory computer readable storage medium of claim 29, wherein the stored server-executable software instructions are configured to cause the server processor to perform operations further comprising:
sending the generated mobile device classifier to a mobile computing device.

* * * * *